No. 692,313. Patented Feb. 4, 1902.
M. A. K. C. LAMBERT.
COOKING UTENSIL.
(Application filed Nov. 23, 1899.)
(No Model.)
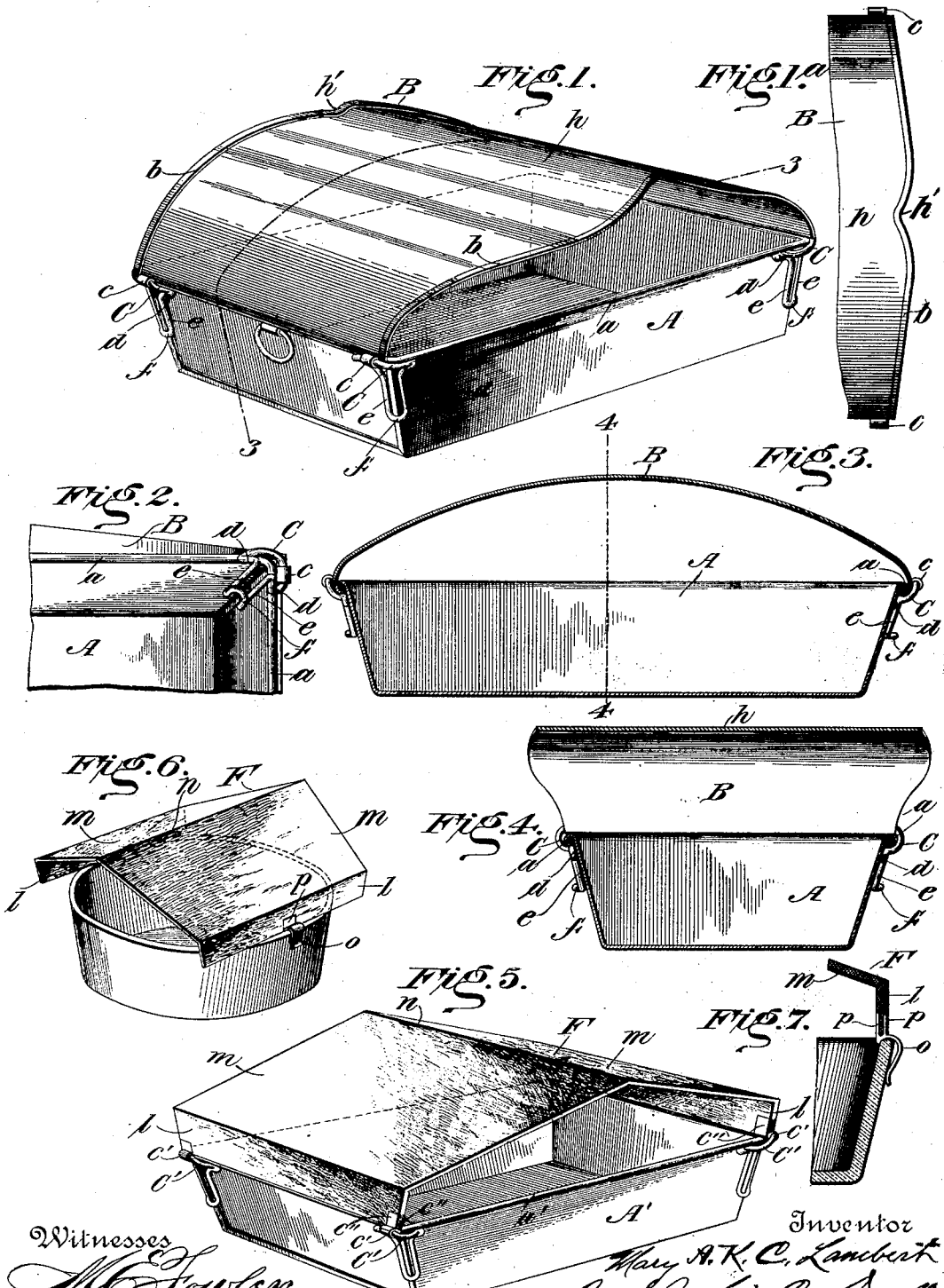
Witnesses
M. C. Fowler
Osgood Howell
Inventor
Mary A. K. C. Lambert
By Julian C. Dowell
Attorney
THE NORRIS PETERS CO., PHOTO-LITHO., WASHINGTON, D. C.

UNITED STATES PATENT OFFICE.

MARY ALICE KOHAWN COBURN LAMBERT, OF CHICAGO, ILLINOIS.

COOKING UTENSIL.

SPECIFICATION forming part of Letters Patent No. 692,313, dated February 4, 1902.

Application filed November 23, 1899. Serial No. 738,055. (No model.)

*To all whom it may concern:*

Be it known that I, MARY ALICE KOHAWN COBURN LAMBERT, a citizen of the United States, residing at Chicago, in the county of Cook and State of Illinois, have invented certain new and useful Improvements in Cooking Utensils; and I do hereby declare the following to be a full, clear, and exact description of the invention, such as will enable others skilled in the art to which it appertains to make and use the same.

This invention relates to improvements in cooking utensils for cooking food of all kinds, and has for its primary object to provide an attachment for baking-pans and the like adapted to disseminate and evenly distribute the heat over the upper surface of the food that is being cooked, so that it may become thoroughly cooked on all sides and through and through, the construction of the attachment and its application to an ordinary baking-pan or the like being such as to permit of a free circulation of air above the bread, meat, or vegetables in the pan, so as to carry off any noxious gases rising from the cooking food that would otherwise permeate the substance of the food, and thus spoil its flavor.

A further object is to produce an attachment of the character referred to which shall be simple in construction, inexpensive in manufacture, and adapted to be easily and quickly applied to cooking pans or vessels in common use.

With these objects in view the invention consists in certain novel features of construction and combination of parts, as will be more fully described in the following specification, and particularly pointed out in the appended claims.

In the accompanying drawings, in which the same letters of reference are used to denote corresponding parts in different views, Figure 1 is a view in perspective of an attachment embodying my invention as designed especially for cooking meat, fish, game, and poultry and applied to an ordinary baking-pan. Fig. 1ᵃ is a detail plan view of one edge of the cover. Fig. 2 is an inverted plan view of one corner of the pan with the attachment applied thereto. Fig. 3 is a vertical longitudinal sectional view of the attachment and pan, the section being taken on line 3 3 of Fig. 1. Fig. 4 is a transverse sectional view on line 4 4 of Fig. 3. Fig. 5 is a view in perspective of a modified form of the invention especially adapted for cooking breadstuffs, dessert, puddings, pastries, and vegetables. Fig. 6 is a similar view of the last-mentioned attachment with fastening devices or supports adapting it to be applied to a circular pan or dish, and Fig. 7 is a detail sectional view of the latter construction.

Referring to the drawings by letter, A denotes an ordinary oblong baking-pan, having a bead *a* running around the upper edge of the same.

B denotes the attachment or cover, which preferably consists of a sheet of thin resilient metal which may be bent or curved on the arc of a circle of sufficient depth to be inverted and placed upon the pan, as shown, leaving fixed openings at each end thereof, which for best results are about three and one-half inches in depth—that is to say, three and one-half inches from the top of the pan to the highest point on the inside of the cover. The cover is gradually broadened from the lower portions or sides thereof, which rest upon the pan toward its center, so as to form flaring end portions or extensions which project over and beyond the sides or ends of the pan to provide a heat-radiating surface along the sides of the pan, over said fixed openings, and preserve an even temperature entirely across the surface of the pan by the protection thus afforded from above as well as the prevention of the escape of the confined air beneath the cover at points coincident with the edges of the pan, which construction insures perfect cooking on all sides as well as at the center. I also preferably provide at the highest point of the arch-like cover, in each end thereof, an inward turn or indentation, as at *h'*, to facilitate the escape of the heated air and gases, the effect of such construction being to cause the air to follow the conduit or flue, as it were, thus formed along the apex of the inside of the cover and escape in divergent currents at the flaring exits formed by said indentations. The attachment may be stamped out of a single sheet of metal, which may be bent or otherwise formed into the desired shape and may be crimped along two of its edges, as shown at *b*, to give it the proper stiffness and stability required, though such crimping may be omitted, if desired. Sleeves c are provided at each corner of the attachment, upon the outside thereof, in which are fitted retaining-clips C, which form the principal means for securing the attachment to the pan, so as to prevent displacement thereof. The clips are formed of spring-wire, and, starting from the sleeve, the wire is bent in a half-circle, straddling the corner of the pan and ending on either side of the sleeve just beneath the bead a, then bent upon itself, as at d, running thence down the sides of the pan a short distance, thence across the corner, and up to a point below the bead a on the pan, thus forming clasping members e, that are connected at their lower ends by a short curved part f, which curves around the corner of the pan. These clips are secured rigidly in the sleeves, and their resiliency and the resiliency of the cover adapts the attachment to be easily removed from or secured in place upon the pan without liability of displacement in use or the necessity for fastening means on the inside of the cover.

The foregoing description applies to the invention in the preferred form, which is particularly adapted for cooking meats, fish, game, and poultry. For cooking said articles a thin metal cover is preferably used, as it heats quickly and affords an equal distribution of the heat over the entire surface of the edibles contained in the pan over which it is placed, and the arc-shaped form is preferable; but a gable-roofed construction or other similar shape may be used. For cooking breadstuffs, cakes, puddings, pastries, and fruits the attachment is essentially the same as that used for cooking meats and the like, the main difference residing in the substance or material of which the cover is made—that is to say, the form or shape of the cover may be the same in both cases; but in the form illustrated in Figs. 5 to 7 of the drawings as being especially applicable to the last-mentioned uses I have shown a gable-roof construction as a modification of the arc-shaped construction shown in Figs. 1 to 4, inclusive.

Referring now to Figs. 5 to 7, inclusive, of the drawings, A' represents the pan, having a bead a' thereon. F denotes the cover, and C' the clips. The cover in this instance is made of some non-conducting material, such as asbestos, and, as shown, has short vertical sides l, upwardly-inclined portions m terminating at a point above the center of the pan in an apex n, this construction forming, in effect, a gable roof. The sides l are preferably about half as high as the space at the center from the top of the pan to the apex n. At the apex the cover is widened substantially as and for the same purpose as the metal cover used for meats and the like, and, like said attachment, it narrows down at its sides to about the width of the pan. The sleeves c', holding the spring-clips, are in this instance formed of metal separate from the cover and are provided with flat portions c'', projecting from either side of the sleeve and pressed tightly upon either side of the cover at the corners, as shown. Fig. 6 shows the attachment applied to a circular dish or pan. The pan in this instance not being provided with a bead, but simply smooth, an especial clip is used, which, as shown in Fig. 7, consists of a flat piece of resilient metal o, bent about in the form shown, having straight flat portions p projecting upwardly on either side of the asbestos cover and which are pressed tightly into the substance of the latter, thus securing the clip thereto.

The asbestos cover is especially adapted to be used in cooking vegetables, pastries, bread, cakes, desserts, and fruits, for, as it is non-conductive, it permits the acids or gases rising from the vegetables, fruits, and the like to pass off before the cover becomes sufficiently heated to radiate heat of a cooking intensity, which would tend to confine such acids or gases in the food, and thus spoil their flavor. It will be understood, of course, that either the arc-shaped form of cover or the gable-roof construction may be made of metal or other suitable material, as may be desired, and that various forms of clips or devices for securing and supporting the cover upon the pan may be employed without departing from the spirit and scope of my invention.

In the use of the expression "arched" in the appended claims I desire it to be understood that said term is intended to cover either the arc-shaped construction, such as illustrated in Figs. 1 to 4 of the drawings, or the gable-roof construction, such as illustrated in Figs. 5 to 7, as well as any merely colorable variation of such shape, the construction of the arch being susceptible of various modifications in shape or configuration without departing from the spirit and scope of my invention.

It may be desirable in some cases to form the ends of the arch or arc-shaped cover extending outwardly over and beyond the sides or ends of the pan without indentations therein, as in the case of the asbestos cover shown in Fig. 5, in which the indentations are omitted. The sloping sides of the cover in the latter case meet at an obtuse angle, and thus provide, in effect, an air duct or conduit at the highest point of the arch over the pan; but the indentations are preferred, because they cause the heated air and gases to escape in divergent currents, and thus facilitate its escape.

In applying the attachment it is simply necessary to hold its sides apart a sufficient distance to admit when it is released of springing into position upon the upper edge of a pan, and it will be noticed with reference to the drawings that in both forms the cover is attached wholly upon the outside of the pan, thus presenting a perfectly smooth under surface with no projections where it joins the side of the pan. Therefore there is nothing to come in contact with the food placed in the pan or the crusts of bread, pastries, and the like. This is a very desirable feature, as will be noted by those skilled in the art of cooking.

Aluminium can be used for higher-priced covers, but should be of the required thickness to get good results—that is, of a thickness slightly above that used by photographers, but thinner than ordinary roofing-tin. The asbestos covers have been found especially desirable for cooking bread, cake, and pastries made of the whole or entire wheat or other coarse grains.

Having thus fully described my invention, what I claim as new, and desire to secure by Letters Patent of the United States, is—

1. In a cooking utensil, an attachment for baking-pans comprising a cover of thin resilient material in the form of an arch adapted to fit over an ordinary pan and provide fixed openings at opposite ends thereof, and fastenings at the sides of the cover for securing and supporting it upon the upper edge of the pan, substantially as described.

2. In a cooking utensil, an attachment for baking-pans comprising an arched cover constructed of thin resilient material adapted to fit over the pan and provide fixed openings at the ends thereof; said cover having its end portions at said fixed openings extended beyond the sides or ends of the pan to insure a heat-radiating surface and even temperature coextensive with the surface of the pan, and suitable fastenings for detachably securing and supporting the cover on the pan, substantially as described.

3. In a cooking utensil, an attachment for baking-pans comprising an arched cover of thin resilient metal crimped or otherwise stiffened along the edges thereof which extend in the direction of the arch, and having its end portions broadened or extended beyond the side portions thereof so as to project beyond or overhang the sides or ends of the pan over which it is fitted, substantially as described.

4. In a cooking utensil, an attachment for baking pans or vessels comprising an arched cover gradually enlarged or widened from its lower edges toward the highest point of the arch, and indented at such point, said cover being formed of non-conducting material and having fastenings at the sides thereof to adapt it to be applied to and sustained upon and removed from the pan, substantially as described.

5. In a cooking utensil, an attachment for baking pans or vessels comprising a cover arched over the pan so as to provide fixed openings at opposite ends thereof, to permit free ventilation through the arch above the pan, said cover being made of a sheet of suitable material having its sides rising abruptly from the pan and thence gradually enlarged or widened toward the highest point of the arch, thus to project at the ends beyond the sides of the pan, said cover being indented at such point, and fastenings at the sides of said cover to adapt it to be applied to, sustained upon and removed from the pan, substantially as described.

6. In a cooking utensil, an attachment for baking pans or vessels comprising a cover arched over the pan so as to provide fixed openings at its ends to permit free ventilation around the arch above the pan; said cover being made of a thin sheet of suitable non-combustible material with its sides rising abruptly from the pan and then extending on a gradually-ascending scale to the center; the ends of the cover being broadened or extended outwardly beyond the sides or ends of the pan on which it is placed, and provided at the highest point thereof with indentations or recesses to facilitate the escape of the heated air and gases rising from the pan; and fastening devices at the sides of the cover for detachably securing it upon the pan, substantially as described.

7. An attachment for baking-pans, comprising an arched cover fitted over the pan with fixed openings at each end thereof and fastenings at the sides adapted to contact with the outside of the pan only for securing and supporting the cover upon the pan; the ends of the cover being provided with indentations centrally of the arch to facilitate the escape of the heated air and gases rising from the pan, substantially as described.

8. An attachment for baking-pans, comprising an arched cover gradually enlarged or widened from its lower edges toward the highest point of the arch, substantially as described.

9. An attachment for baking-pans, comprising an arched cover gradually enlarged or widened from its lower edges toward the highest point of the arch and indented at such point, substantially as and for the purpose described.

10. An attachment for baking-pans, comprising an arched cover gradually enlarged or spread outwardly from its lower edges toward the highest point of the arch, and suitable fastenings for securing the cover to a pan, substantially as described.

In testimony whereof I affix my signature in presence of two witnesses.

MARY ALICE KOHAWN COBURN LAMBERT.

Witnesses:
M. E. FOWLER,
OSGOOD H. DOWELL.